Dec. 25, 1923.
S. M. METZ
1,478,878
FUEL SUPPLY SYSTEM
Filed Jan. 26, 1922
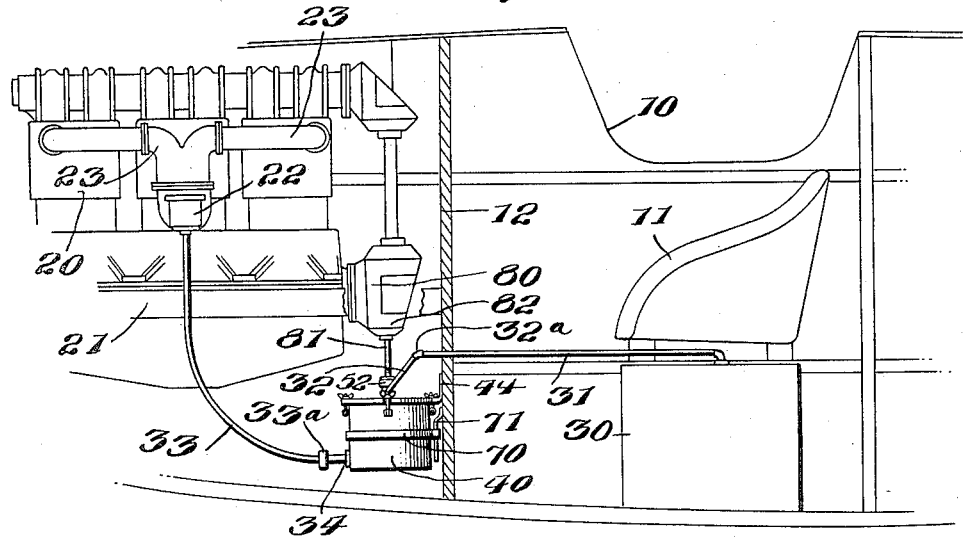
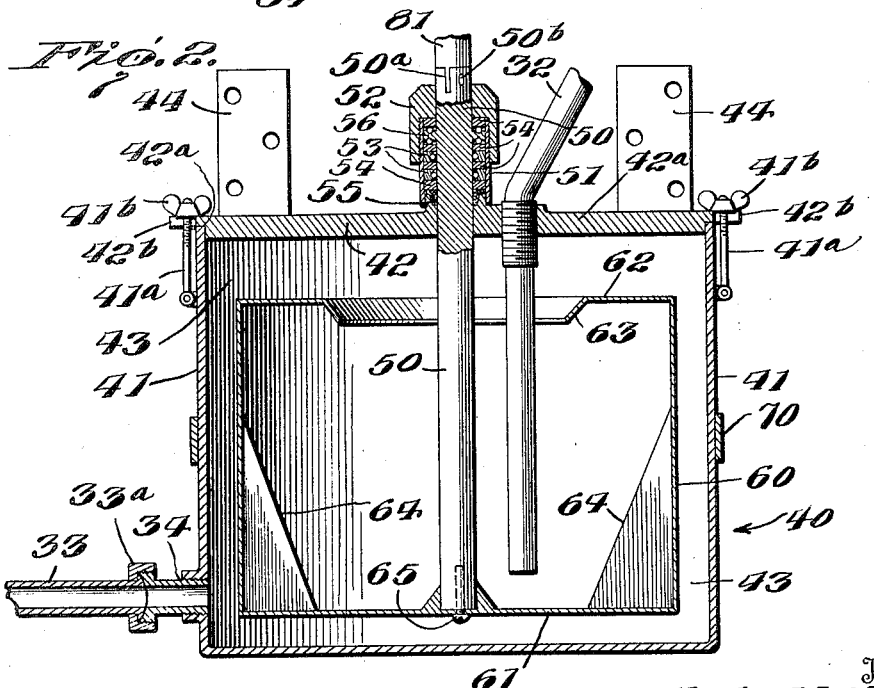
Witness:
Robert F. Beck
Inventor
Stanley M. Metz,
By 
Attorney Patented Dec. 25, 1923.

1,478,878

UNITED STATES PATENT OFFICE.

STANLEY M. METZ, OF LANGLEY FIELD, VIRGINIA.

FUEL-SUPPLY SYSTEM.

Application filed January 26, 1922. Serial No. 531,891.

*To all whom it may concern:*

Be it known that I, STANLEY M. METZ, a citizen of the United States of America, and a resident of Langley Field, Elizabeth City County, Virginia, have invented certain new and useful Improvements in and Relating to Fuel-Supply Systems, of which the following is a specification.

This invention relates to certain improvements in fuel supply systems; and the nature and objects of the invention will be readily understood and appreciated by those skilled in the art in the light of the following explanation and detailed description of the accompanying drawings illustrating what I now believe to be the preferred embodiment or mechanical expressions of the invention from among various other forms, arrangements, modifications, combinations and constructions within the spirit and scope thereof.

In order to secure the maximum performance and efficiency of operation from motors of the internal combustion type, it is essential that the fuel supply systems of such motors deliver fuel thereto in a pure, clean state free from water, sediment and all other foreign matter. It is the general practice to filter or strain internal combustion motor fuel before filling the supply tanks of motor fuel systems therewith, but no matter what precautions may be taken with fuel before filling fuel supply tanks therewith or what care may be exercised in handling motor fuel before use thereof, experience has shown that there is always a possibility of the entry and collection of water, sediment and other foreign matter in fuel with the resulting decrease in efficiency of the fuel and the danger of motor stoppage or failure therefrom. After fuel is placed in a fuel supply system there is the further collection of scale or particles of foreign matter from the tanks, pipe lines and other elements of the system with which the fuel comes in contact or with which it is in communication, as well as the accumulation of sediment and other foreign matter from the repeated and various supplies of fuel placed in and passing through the system.

The various types of internal combustion motor fuel supply systems in general use attempt to overcome the foregoing conditions encountered in operation and use thereof, by providing various arrangements and constructions of strainers, filters and traps in the tanks, fuel lines and passages of the systems for removing water, sediment and other foreign matter from the fuel before delivery to a motor. However, it is found that these various arrangements do not satisfactorily overcome the problem of purifying fuel in a supply system before delivery to a motor, and that the use thereof in fuel supply systems presents certain serious disadvantages and difficulties. Usually these strainers and filters are fixed in the path of fuel passing through the supply system, so that, the fuel is forced to pass therethrough and the filters or strainers are intended to remove water, sediment and foreign mattter from the fuel passing therethrough. Strainers and filters so arranged in a fuel system present obstructions to the even, steady passage of fuel, and after an interval of time the sediment and foreign matter removed thereby accumulates thereon and adjacent thereto, and partially obstructs the passage of fuel or causes a stoppage in the system with resulting motor failure.

Further, strainers and filters of a nature and character to permit of sufficiently rapid flow of fuel therethrough do not remove all foreign matter in the fuel but permit passage of certain of the foreign matter therethrough and delivery thereof to a motor, and where filters and strainers of a very fine character are used, aside from the tendency to slow up and obstruct the flow of fuel, it is found that sediment and foreign matter of certain characteristics will not be removed from the fuel by such filters and strainers but will pass therethrough and be delivered with the fuel to the motor.

One of the main objects of the present invention is to overcome the foregoing conditions encountered in the operation and use of fuel supply systems and to eliminate the difficulties and disadvantages inherent in the devices at present in general use with fuel supply systems for removing water, sediment and other foreign matter from the fuel in such systems.

A further object of the invention is to provide a fuel supply system with a device positively operated during operation of the motor with which a fuel supply system is connected, for purifying the fuel passing through the system by removing all foreign matter therefrom before delivery to the motor.

A further object of the invention is to provide a fuel supply system with a device for purifying the fuel passing therethrough by removing all foreign matter therefrom before delivery to a motor with which the system is in operative connection, and to provide such a purifying and filtering device in a fuel supply system which will not retard or otherwise affect the normal, required passage and supply of fuel through the fuel supply system to a motor.

A further object of the invention is to provide a fuel supply system in which the fuel passing therethrough is subjected to the action of centrifugal force to remove water sediment and all other foreign matter from the fuel before delivery to a motor, so that, the fuel when delivered to the motor is in a clean, pure state free from foreign matter and the possibility of motor failure from foreign matter in the fuel is reduced to the minimum.

A further object of this invention is to provide a fuel supply system embodying and including a mechanically operated fuel purifying and filtering device adapted to be operated by a motor with which the fuel supply system is connected, for removing water, sediment and all other foreign matter from the fuel passing through the system before delivery to the motor, and to provide such a device in a fuel system so constructed and arranged that the bearing surfaces of all moving parts thereof are protected from the corrosive action of fuels, and so mounted that the device is readily accessible for quick removal of accumulated foreign matter without deranging or disturbing the fuel system installation.

A further object of this invention is to provide a mechanically operated device for purifying and filtering fluid fuels, which device is adapted for and capable of operation on and in connection with fuel supply systems of all types, including those of the pressure type and those of the non-pressure type.

With the foregoing and various other objects in view, which will be readily apparent to and recognized and appreciated by those familiar with the arts involved, the invention consists in certain novel features in construction and in combinations and arrangements of parts and elements, as more fully and particularly set forth and specified hereinafter.

Referring to the accompanying drawings:

Fig. 1 is a view more or less diagrammatical, of a portion of a fuel supply system embodying features of the present invention applied to and installed on and in connection with an internal combustion motor mounted in an airplane, portions of the airplane and motor being diagrammatically illustrated.

Fig. 2 is a vertical detail section through the purifying and filtering device of the fuel supply system of the invention.

The invention is illustrated and disclosed in the accompanying drawings as applied to and installed on an airplane and in operative connection with an internal combustion motor therefor. This application of the invention is illustrated because of the fact that the various conditions and problems heretofore pointed out and referred to as encountered in the operation of internal combustion motor fuel supply systems generally, are met with in their most extreme form in the operation and use of internal combustion motor fuel supply systems on aircraft. Those familiar with the piloting and maintenance of airplanes are aware of the serious consequences possible as a result of motor failure or stoppage during flight, and of the frequent airplane motor failures due to impurities and foreign matter in the fuel delivered to a motor, as well as, the failures caused by stoppage of fuel from accumulated foreign matter in strainers, filters and in the fuel lines themselves. With the vibration, severe shocks, and sudden temperature changes to which airplane fuel supply systems are subjected in operation, and various other conditions which such systems must meet and overcome, as well understood by those skilled in the art, it will be apparent that such systems receive their most extreme and severe test in the illustrated application. Therefore, it is to be understood that the application and embodiment of the invention illustrated and described herewith is purely by way of example, to clearly bring forth the problems solved and conditions overcome by the invention, it being apparent that the invention is capable of various other embodiments and applications to fuel supply systems generally.

The application of the invention to an airplane and the motor therefor, is diagrammatically illustrated in Fig. 1 of the accompanying drawings, in which a portion of the body or fuselage 10 of an airplane provided with a motor 20 mounted therein on engine bearers 21, in the usual or any other suitable manner, is disclosed. The portion of the fuselage 10 shown includes the usual pilot's seat 11 and engine or motor bulkhead 12 extending transversely across the fuselage between the seat 11 and the after or rear end of the motor 20, and adjacent the motor to provide the usual pilot's cockpit, all of which conforms to the more or less conventional airplane construction and design familiar to those skilled in the art.

The fuel supply system illustrated herewith by way of example, is of the so-called pressure type, in which pressure is maintained within the fuel supply tank for forcing fuel therefrom through the supply system to a motor. Pressure can be created and maintained within the supply tank and system in any of a number of ways well known and understood by those familiar with this art, and hence, it is not deemed essential in the presentation of this invention to illustrate and describe in detail any of these well known means for creating and maintaining pressure in the fuel supply system shown herewith. It is to be understood, therefore, that the example illustrated herewith diagrammatically represents a fuel supply system of the pressure or analogous type embodying the features of the present invention.

The pressure fuel supply system illustrated in Fig. 1 of the accompanying drawings, includes a fuel supply tank 30, in the present instance mounted beneath the seat 11 in the pilot's cockpit of the fuselage 10. The fuel supply tank 30 may be of any desired form or construction and mounted or installed at any desired location, following the structural and design requirements of the particular application and installation thereof. The supply tank 30 is connected and placed in communication with the charge forming device or carbureter 22 of the motor 20, by a supply line or conduit extending from the tank forwardly to the motor, and through which line fuel is adapted to be forced by pressure from the tank 30 to the carbureter 22, from which it is drawn and discharged in the form of a combustible mixture through the intake manifold 23 to the motor 20. In the present instance, the carbureter and motor fuel supply line or conduit consists of a tube or pipe 31 in communication with and receiving fuel from the tank 30, and extending forwardly through the bulkhead 12, to and discharging through a pipe 32 into an enlarged chamber or compartment formed in the supply line by a purifying and filtering device 40 mounted on the forward side of the bulkhead 12 below the motor 20. A pipe 33 is connected with and receives fuel from the lower end of the purifying and filtering device 40, and this pipe 33 leads therefrom to and discharges fuel into the carbureter 22 of the motor 20. Thus, it is seen that fuel is forced by pressure in the tank 30, through pipes 31 and 32 to the enlarged chamber in the supply line formed by the purifying and filtering device 40, and is discharged from the device 40 free from all foreign matter, as will be explained hereinafter. through pipe 33 to the motor carbureter 22.

The fuel purifying and filtering device 40 mounted in and forming the enlarged purifying chamber in the fuel supply line from the tank 30 to the motor 20, comprises a cylindrical cup-like casing 41 having an open upper end which is closed by a cover or plate 42 to form an air and liquid tight chamber 43 within the cup-like casing 41 and adapted to be in communication with and form a portion of the fuel supply line from the fuel supply tank to the motor. The cover plate 42 is formed to fit tightly into and close the upper open end of the casing 41, and is provided with an edge extension or flange 42$^a$ which bears upon the upper edge of the casing 41 and maintains the cover plate 42 in proper position in and forming an air and liquid tight closure for the casing 41. The flange 42$^a$ is provided with a series of outwardly projecting ears 42$^b$ therearound and the casing 41 is provided with a series of locking bolts 41$^a$ pivotally mounted thereon below said cover ears 42$^b$, respectively. The ears 42$^b$ are formed with slots, apertures or the like to receive the bolts 41$^a$ and the bolts are provided with wing nuts 41$^b$ screw threaded on their outer free ends, respectively. The bolts 41$^a$ can thus be swung upwardly into the apertures or slots in the ears 42$^b$ with the ends thereof extending thereabove, respectively, and the wing nuts 41$^b$ screwed tightly down onto the ears, firmly and securely binding the cover plate on and to the upper end of the casing 41, as clearly shown in Fig. 2 of the drawings. The cover plate is provided, in the present instance, with a pair of spaced brackets 44 extending outwardly and upwardly from one side thereof to provide for mounting and attaching the casing 41 and cover 42 forming the air and liquid tight chamber 43, in applied, installed position in the fuel supply line.

The cover 42 is provided with a central bore or opening forming a bearing through and in which a shaft 50 is mounted for rotation. The shaft 50 extends downwardly through the chamber 43 and terminates a distance above the closed end of the casing 41, and at the opposite end the shaft extends a distance outwardly and terminates a distance from the cover plate 42. The outer end of the shaft 50 is formed with a transverse slot 50$^a$ therein, and a pin 50$^b$ extends and is removably fitted transversely through the end of the shaft 50 and transversely across the slot 50$^a$ therein. A bearing housing 51 encloses the outer end portion of the shaft 50, being spaced therefrom and secured at one end to the cover plate 42 in any desired or suitable manner. The bearing housing 51 terminates a distance from the outer end of the shaft 50, and a removable sleeve nut 52 is mounted on the outer end of the housing 51 and is provided with a central bore receiving and through which the shaft 50 extends and is journaled therein. A series of anti-friction or ball bearings 53 are mounted and confined within the housing 51 around the shaft 50, and maintained in proper spaced relation along and around the shaft 50 to form a "long" bearing, by the bearing spacers 54. A collar 56 can be formed integral with shaft 50 and provided with ball races on opposite faces thereof to receive anti-friction balls interposed between the collar 56 and adjacent bearing spacers 54 and thus provide in effect a thrust bearing to prevent longitudinal movement or play of the shaft 50 and to maintain the shaft in proper position and mounting in the cover plate 42 and bearings 53 formed within the housing 51. Any suitable or desired packing 55 is provided within the housing 51 around the shaft 50 to prevent leakage from the chamber 43 through the cover plate 42 around the shaft 50. The shaft 50 is thus mounted for rotation within the chamber 43 formed by the casing 41, in a bearing formed and arranged entirely outside of and cut off from communication with the chamber 43 and contact with the contents thereof, and which bearing mounting of the shaft 50 is so arranged that lateral play and end thrust of the shaft 50 are prevented to permit of rotation of the shaft 50 at a high rate of speed with a minimum of vibration and friction.

A bowl 60 is mounted on the shaft 50 and suspended thereon within the chamber 43 for rotation therewith. The bowl 60 is formed with a closed bottom end 61 and a partially closed end 62 terminating in a depressed, inwardly or downwardly extending lip 63, to provide an upper end discharge opening into the chamber 43. Vanes or fins 64 are provided within the bowl 60 and extending longitudinally from the bottom 61 and inwardly a distance from the side wall thereof. These vanes 64 have the inner free edges thereof inclined from the bottom 61 outwardly to the side wall of the bowl 60 and terminate a distance below the discharge end 62 of the bowl. In other words, the vanes 64 extend upwardly from the bottom of the bowl 60, inwardly from the side wall thereof, and are gradually reduced in width upwardly to and terminating at the side wall a distance below the upper discharge end 62 of the bowl. The bowl 60, so constructed and formed, is mounted on the free inner end of the shaft 50 by means of a screw, bolt or the like 65 extending centrally through the bowl bottom 61 and removably secured into a longitudinal bore formed in the free end of the shaft 50. Thus in operative mounted position, the bowl 60 is secured centrally of the bottom wall 61 thereof to the inner, free end of the shaft 50 and extends upwardly around the shaft to and terminating a distance from the cover plate 42, and with the shaft extending centrally through the bowl and outwardly through the discharge opening in the upper end wall 62 thereof. The bowl 60 is suspended within the chamber 43 on and rotatable by the shaft 50, and is of such a diameter and depth that spaces are formed between the sides and ends of the bowl and the sides and ends of the casing 41, respectively. The pipe 32 is mounted in the cover plate 42 adjacent the shaft 50 and extends into the chamber 43, through the discharge opening in the bowl and into and terminating with the outlet thereof at the bottom or lower end of the bowl 60. A filtered fuel discharge 34 is provided through the side of the casing 41 in communication with and adapted to receive fuel from the bottom or lower end of the chamber 43.

In the illustrated installation of the pressure fuel supply system embodying the invention, the purifying and filtering device 40 thereof is mounted on the forward side of the engine bulkhead 12 by the brackets 44, with the device 40 below the after or crank end of the motor 20. A band 70 may be secured around the device 40 and mounted and detachably secured in a fixed bracket 71 on the bulkhead 12, in order to more firmly secure the casing 41 of the device 40 in mounted position against vibration and possible shocks to which it may be subjected in use. The fuel inlet pipe 32 is coupled to and connected with the fuel supply line pipe 31 from the tank 30 by means of any suitable union or the like 32ª, and the fuel supply line pipe 33 is detachably connected with the filtered fuel discharge 34 from the lower end of the chamber 43, by a detachable coupling or union 33ª of the usual or any other suitable form and construction. Thus, the filtering device 40 is mounted in and forms a part of the fuel supply line from the tank 30 to the carbureter 22 of the motor 20, and provides an enlarged chamber forming a part of the supply line within which fuel passing through the line is purified and filtered before delivery to the motor.

The filtering device 40, mounted and arranged as above described, is below the after or crank end of the motor 20, with the outer end of the shaft 50 below the cam shaft drive 80 connected with and operated by the motor crank shaft, as well understood by those familiar with this art. The cam shaft drive 80 is provided with, in the present instance, a vertically disposed depending shaft 81, substantially in line with and operatively connected to the shaft 50, and having a gear 82 in operative connection with the cam shaft drive 80, so as to rotate the shafts 81 and 50 during operation of the motor 20. The lower end of the shaft 81 is provided with a tongue adapted to fit in the slot 50ª in the outer end of shaft 50 and be secured therein and thereto by the pin 50ᵇ, thus forming a secure and operative coupling between shaft 81 and shaft 50 adapted to be rotated thereby. However, it is understood that any suitable or desired type of shaft and coupling, for rotating the shaft 50 from the motor 20 may be utilized, as for example, in those installations in which the filtering device 40 cannot be mounted directly below the motor camshaft drive any suitable flexible shaft can be utilized, such as the usual airplane tachometer or other accessory drive shaft.

The operation of the pressure fuel supply system, as illustrated and described herewith, by way of example, embodying the present invention will now be explained. Fuel from the supply tank 30 is forced, in this instance, by pressure from the tank 30, through the pipe 31 and pipe 32 into the bottom or lower closed end of the bowl 60. With the motor 20 in operation the bowl 60 is rotated by the shaft 50, through the shaft 81 in operative connection with the cam shaft drive 80 of the motor. The pipe 32 discharges fuel into the lower end of the rotating bowl 60 and the fuel is forced from the bowl through the open, upper end of the bowl into the surrounding chamber 43, and from this chamber 43 through the discharge 34 into pipe 33 and onto the carbureter 22. The mass of fuel in the rotating bowl 60 is subjected to the action of centrifugal forces created and established by the rotation thereof, and all foreign matter, such as water, oil, sediment, and such like, which is heavier than the fuel, is thrown or forced toward the outer side of the rotating mass of fuel, and maintained by centrifugal force against and adjacent the side of the bowl 60. The clean, filtered fuel free from foreign matter is formed at the central or inner portion of the rotating mass and passes upwardly and outwardly through the filtered fuel discharge opening formed in the upper end 62 of the bowl and is discharged into the chamber 43 surrounding the rotating bowl 60. The depressed or inwardly turned lip 63 around and forming the edge of the discharge opening from the bowl 60, effectively prevents the passage or discharge from the bowl 60 of the foreign matter at the sides of the bowl into the chamber 43 and clean fuel passing thereinto from the central portion of the mass of fuel in the rotating bowl 60. The vanes or fins 64 assist and materially aid in the retention of foreign matter at the sides of the bowl and cause, in effect, a collecting or settling action of foreign matter toward the outer sides and bottom of the bowl 60. Thus, it is apparent that fuel passing into the bowl 60 is subjected to centrifugal force which removes foreign matter therefrom, and that the bowl collects and retains the foreign matter, clean fuel only being discharged from the bowl into the surrounding fuel supply line chamber 43. In operation, the action is continuous, the fuel passing from the tank into the bowl where foreign matter is removed by the action of centrifugal force and then into the chamber 43 and through pipe 33 to the motor.

The device 40 is mounted at such a point as to be readily accessible for removal of the accumulated foreign matter removed from the fuel and collected by the bowl 60. The fuel supply is shut off from the tank 30 and the coupling 33ᵃ is detached to disconnect the pipe 33 and discharge 34 in the casing 41. Then by releasing the locking bolts 41ᵃ and the band 70 from its mounting 71, the casing 41 can be withdrawn and removed from the cover plate 42 and bowl 60. The securing screw 65 is removed from shaft 50 which permits detaching bowl 60 from the shaft and suitable cleaning of the bowl to remove collected matter therein. The manner of assembling the device 40 and fuel supply line after cleaning will be apparent from the foregoing.

Particular attention is directed to the mounting of the shaft 50 and rotating bowl 60 within the chamber 43, which permits of a disposition of the bearing surfaces for the operating shaft 50 out of contact with fuels passing through the supply system. As well known, fuels of the character used for internal combustion motors have a corrosive action on metals and cause "freezing" and breakage of shafts or other moving elements where they come in contact with the bearing surfaces therefor, due to this corrosive action.

In the present invention, the bearings are entirely outside of and removed from the bowl 60 and chamber 43 through which fuel passes. Further, a "long" bearing is provided to prevent and overcome lateral play or vibration, which permits of suspending shaft 50 and bowl 60 within the casing 41 without interior supports or bearing surfaces therefor.

The comparative size and capacity of chamber 43 and bowl 60 will depend upon the fuel consumption and capacity of the motor with which it is installed. The rate of speed at which the bowl 60 is rotated may be varied in any number of well known ways to meet the requirements of each particular installation, and the manner in which the device is mounted in installed position may also be accomplished in the most efficient manner to meet the structural and design requirements of each particular installation.

It is clear, of course, that in use as a non-pressure (gravity, pump, etc.) type of system, the purifying and filtering device must be installed in different ways and at different levels, locations, etc. with respect to the tanks, motors and carbureters, as will be recognized by those familiar with the operation of such types of fuel supply systems. Further, other means than the motor itself may be utilized to drive the shaft 50 and bowl 60, such, for example, as a fan motor for aeronautical installations.

It is evident that the invention is capable of various modifications, substitutions and variations, and hence I do not wish to limit my invention to the exact disclosures hereof.

Desiring to protect my invention in the broadest manner legally possible what I claim is:

1. A fuel supply system embodying a fuel supply tank, a fuel line from said tank to a point of fuel consumption, a chamber formed in said supply line, and a bowl rotatably supported in said chamber and arranged to receive and discharge fuel therefrom, the said bowl when rotated adapted to remove foreign matter from fuel passing therethrough by the action of centrifugal force.

2. A fuel supply system embodying a fuel supply line from a source of fuel supply to a point of fuel consumption, a chamber formed in said line, a bowl rotatably suspended in said chamber, the said bowl arranged to receive fuel from said source of supply and to remove foreign matter therefrom by centrifugal force created by rotating said bowl, the said bowl collecting the foreign matter removed from the fuel rotated thereby and discharging cleaned fuel into said chamber.

3. A fuel supply system embodying a fuel line from a source of fuel supply to a point of fuel consumption, a casing forming a chamber connected in said fuel line in communication with and forming a part thereof, a member rotatably suspended within the chamber formed by said casing for removing and collecting foreign matter from fuel passing therethrough by the action of centrifugal force created by rotating said member, and said casing removable from the supply line for access to said rotatable element.

4. A fuel supply system embodying a fuel supply line from a source of fuel supply to a point of fuel consumption, a chamber formed in said fuel line, and a centrifugal separating member rotatably suspended within said chamber by a bearing on the exterior of said chamber removed from contact with fuel passing therethrough.

5. A fuel supply system embodying a fuel supply tank, a fuel line from said tank to a point of fuel consumption, a chamber formed in said fuel line, a bowl rotatably suspended within said chamber, the said bowl closed at the lower end thereof and having a discharge opening through the upper end thereof, and the portion of said fuel line from the source of supply to said bowl discharging thereinto adjacent the closed lower end thereof, and said bowl adapted when rotated to remove foreign matter from fuel discharged therein by centrifugal force and to discharge clean fuel therefrom into said chamber through the upper end discharge opening of said bowl.

6. In combination with an internal combustion motor, a fuel supply system embodying a source of fuel supply, a fuel line from said source of supply to the motor, a chamber formed in said fuel line centrifugal, separating means in said chamber for removing foreign matter from the fuel passing therethrough, and from operating mechanism for said separating means.

7. In combination with an internal combustion motor, a fuel supply system embodying a source of fuel supply, a fuel line from said source of supply to the motor, a chamber formed in said fuel line intermediate the source of supply and the motor, a bowl rotatably suspended within said chamber and adapted to receive fuel from said source of supply and to remove foreign matter therefrom by centrifugal force created by said bowl when rotated, the said bowl discharging fuel therefrom into said chamber, and means for rotating said bowl operatively connected with and driven by the motor during operation thereof.

8. In combination with an internal combustion motor and a fuel supply system therefor including a fuel supply line; the said fuel supply line having a separating chamber forming a portion thereof, a centrifugal separating element detachably mounted in said chamber, driving connections for said separating element, and the said chamber formed to permit removal and replacement of said separating element from and to operative position therein.

9. In combination with an internal combustion motor and a fuel supply system therefor including a fuel supply line from a source of supply to the motor, a casing connected in said supply line and forming a closed chamber in communication therewith for passage of fuel therethrough, a centrifugal separating bowl rotatably suspended in said chamber, the said supply line from the source of supply discharging into said separating bowl, operating means for said bowl, the said bowl separating foreign matter from the fuel and discharging clean fuel into said closed chamber during rotation thereof, and the supply line connected with said chamber and conducting clean fuel therefrom to the motor.

10. In a fuel supply line to an internal combustion motor, a centrifugal separating element rotatably supported in the fuel line, the said element mounted in bearings on the exterior of the fuel line removed from contact with fuel passing therethrough, and operating connections from the motor for rotating said element.

11. In an internal combustion motor fuel supply system including a source of fuel supply and a fuel line therefrom to a motor; a centrifugal filter mounted in and forming a part of said fuel line intermediate the source of supply and a motor for passage of fuel therethrough from the supply to the motor, and operating mechanism for driving said filter.

12. In a fuel supply system, a casing having a removable closure normally closing said casing to form a liquid tight chamber therewithin, a centrifugal separating bowl within the casing compartment and rotatably supported on the casing closure, a fuel line from a source of fuel supply extending through said closure and discharging into said separating bowl, and a filtered fuel line detachably coupled to said casing in communication with and receiving filtered fuel from the casing compartment, the said casing removable from the closure therefor for access to said separating bowl.

STANLEY M. METZ.